United States Patent [19]
Kozuka

[11] Patent Number: 5,998,779
[45] Date of Patent: Dec. 7, 1999

[54] PHOTOELECTRIC CONVERSION APPARATUS

[75] Inventor: Hiraku Kozuka, Hiratsuka, Japan

[73] Assignee: Canon Kabushiki Kaisha, Tokyo, Japan

[21] Appl. No.: 08/993,057

[22] Filed: Dec. 18, 1997

[30] Foreign Application Priority Data

Dec. 24, 1996 [JP] Japan .................................. 8-343149

[51] Int. Cl.$^6$ .............................. H04N 3/14; H04N 5/335
[52] U.S. Cl. .................................. 250/208.1; 250/208.4; 348/241; 348/294
[58] Field of Search ........................ 250/208.1, 208.4, 250/208.5; 348/241, 262, 294

[56] References Cited

U.S. PATENT DOCUMENTS

| | | | |
|---|---|---|---|
| 4,734,776 | 3/1988 | Wang et al. ............................. | 348/306 |
| 4,821,104 | 4/1989 | Kondo ...................................... | 348/241 |
| 5,331,421 | 7/1994 | Ohzu et al. .............................. | 340/262 |
| 5,339,106 | 8/1994 | Ueno et al. .............................. | 348/243 |
| 5,396,289 | 3/1995 | Nakamura ................................ | 348/294 |
| 5,434,619 | 7/1995 | Yonemoto ................................ | 348/241 |
| 5,771,070 | 5/1998 | Ohzu et al. .............................. | 348/241 |

*Primary Examiner*—Edward P. Westin
*Assistant Examiner*—Thanh X. Luu
*Attorney, Agent, or Firm*—Fitzpatrick, Cella, Harper & Scinto

[57] ABSTRACT

Disclosed is a photoelectric conversion apparatus including a photoelectric conversion unit, a plurality of output lines to which a signal output from the photoelectric conversion unit is read out, a unit for resetting the plurality of output lines to a fixed potential, and a unit for directly connecting the plurality of output lines.

21 Claims, 6 Drawing Sheets

PHOTOELECTRIC CONVERSION APPARATUS

BACKGROUND OF THE INVENTION

1. Field of the Invention

The present invention relates to a photoelectric conversion apparatus such as a one- or two-dimensional photoelectric conversion apparatus for reading an image for a facsimile apparatus, an image scanner, a digital copying machine, or an X-ray image pickup apparatus and, more particularly, to removal of FPN (Fixed Pattern Noise).

2. Related Background Art

As an image read system for a facsimile apparatus, an image scanner, a digital copying machine, or an X-ray image pickup apparatus, a read system using a reduction optical system and a CCD has been used. However, recent development of a CIS (Contact Image Sensor) for a 1×-magnification system, in which a multiple of single-crystal silicon chips are mounted, is also remarkable.

FPN in such a multi-chip CIS in which a plurality of sensor chips are coupled is classified into FPN generated in a chip and FPN generated between chips. If the FPN is large, vertical stripes are generated on an image and adversely affect the image quality. Therefore, the FPN must be reduced to a minimum.

A technique of correcting FPN will be described with reference to FIGS. 7, 8, and 9. FIG. 7 is a circuit diagram of one bit of a one-dimensional photoelectric conversion apparatus having a photoelectric conversion device 9 for each pixel. FIGS. 8 and 9 are timing charts of the photoelectric conversion apparatus (*Journal of the Society for Television*, Vol. 47, No. 9 (1993), p. 1180).

The circuit operation and FPN removal will be described. Referring to FIG. 8, a start pulse SP is supplied to a shift register SR 39 in synchronism with a clock CLK to set a reset pulse ΦCR at "H" so as to turn on MOS transistors 15 and 16 and reset signal holding capacitors CTS 1 and CTN 2. The light amount of image is accumulated in the base of the photoelectric conversion device 9. When accumulation is complete, a transfer pulse ΦTS is set at "H" to turn on a transfer MOS transistor 13. A light signal containing noise is read out and transferred to the optical signal holding capacitor CTS 1. Next, a reset pulse ΦBRS is set at "H" to turn on a MOS transistor 11. A reset pulse ΦERS is set at "H" to reset the sensor 9 of the photoelectric conversion device. After a predetermined time, a reset pulse ΦTN is set at "H" to turn on a noise transfer MOS transistor 14, so a noise component corresponding to a signal component in the photoelectric conversion device 9 which has no optical signal is transferred to the noise signal holding capacitor CTN 2. The reset pulse ΦBRS is set at "L", and the reset pulse ΦERS is set at "H" to reset the sensor again, and the next accumulation is started. In this example, one read cycle of one photoelectric conversion device has been described. For photoelectric conversion devices of one line, the same circuit elements as in FIG. 7 which correspond to each photoelectric conversion device operate in a similar manner, so optical signal charges and noise signal charges of one line sensor are transferred to corresponding holding capacitors.

During accumulation, scanning is started in response to input pulses Φ1 and Φ2 which are phase-inverted by the shift register SR 39. First, a reset pulse ΦCHR is set at "H" to turn on reset MOS transistors 5 and 6, so an optical signal common output line 3 and a noise signal common output line 4 are reset. Thereafter, a scanning pulse from the shift register SR 39 is set at "H" to turn on scanning MOS transistors 17 and 18, so data in the signal holding capacitors CTS 1 and CTN 2 are divided by the capacitors of the common output lines and output to the common output lines 3 and 4, respectively. The common output lines have capacitors CHS 7 and CHN 8, respectively. The optical signal common output line will be defined as CHS 7, and the noise signal common output line as CHN 8 hereinafter. The signals output to the common output lines 3 and 4 are amplified by preamplifiers 19 and 20, respectively. The difference between the light signal component and the noise signal component is calculated by a differential amplifier 21. The difference signal is held by a clamp circuit 10, amplified by an amplifier 24, and output as an image signal. The reset pulse ΦCHR is set at "H" to turn on the reset MOS transistors 5 and 6, so the capacitors CHS 7 and CHN 8 of the common output lines are reset to a reference potential VCHR, and data of signal holding capacitors CTS and CTN for the next bit are read out.

FIG. 9 is a timing chart showing this read portion. The pulses Φ1 and Φ2 are input to the shift register SR 39, and the reset pulse ΦCHR for resetting the common output lines 3 and 4 is output in synchronism with the clock signal CLK. This operation is repeated at a period T to output signals of all bits. The output signal is input to the differential amplifier 21 through the preamplifiers 19 and 20 of voltage follower and output from the IC. FPN in the chip is generated mainly due to an hFE variation in the bipolar transistor 9 of each pixel. The hFE variation of each pixel can be canceled by the above S-N scheme which subtracts the noise signal component from the light signal component. As for FPN between chips, the sensor output is clamped to a reference potential VREF by the clamp circuit 10 shown in FIG. 6. The difference between chips corresponds to only the offset of the amplifier next to the clamp circuit 10 and can be reduced.

However, FPN cannot be sufficiently removed by the above techniques. In the prior art, it is assumed that the potentials of the common signal line capacitors CHS and CHN completely equal during a period A shown in FIG. 9, i.e., while the common signal line capacitors CHS and CHN are reset to the reference potential VCHR to float. In fact, after the common signal line capacitors CHS and CHN are reset, they have different potentials.

This may be attributed to the difference between the reset MOS transistors 5 and 6 for the common signal line capacitors CHS and CHN, or the difference between the common signal line capacitors CHS and CHN and the parasitic capacitance of a power supply line, a GND line, or various pulse lines.

The potential difference between the common signal line capacitors CHS and CHN, which is generated after the common signal line capacitors CHS and CHN are reset, results in disadvantages such as an increase in the FPN due to the level difference between odd-numbered bits and even-numbered bits of the photoelectric conversion device or the difference between chips. However, in an actual IC, this difference can hardly be completely removed, resulting in large difficulty in FPN reduction.

SUMMARY OF THE INVENTION

It is an object of the present invention to reduce FPN in a photoelectric conversion apparatus.

It is another object of the present invention to cancel the potential difference between output lines.

In order to achieve the above objects, according to the present invention, there is provided a photoelectric conversion apparatus comprising photoelectric conversion means, a plurality of output lines for reading out a signal output from the photoelectric conversion means, first switch means for resetting the plurality of output lines to a fixed potential, and second switch means for directly connecting the plurality of output lines.

With the above arrangement, a photoelectric conversion apparatus having a high S/N ratio can be provided.

The other objects and features will be apparent from the following specification and drawings.

DESCRIPTION OF THE PREFERRED EMBODIMENTS

Figure 1:
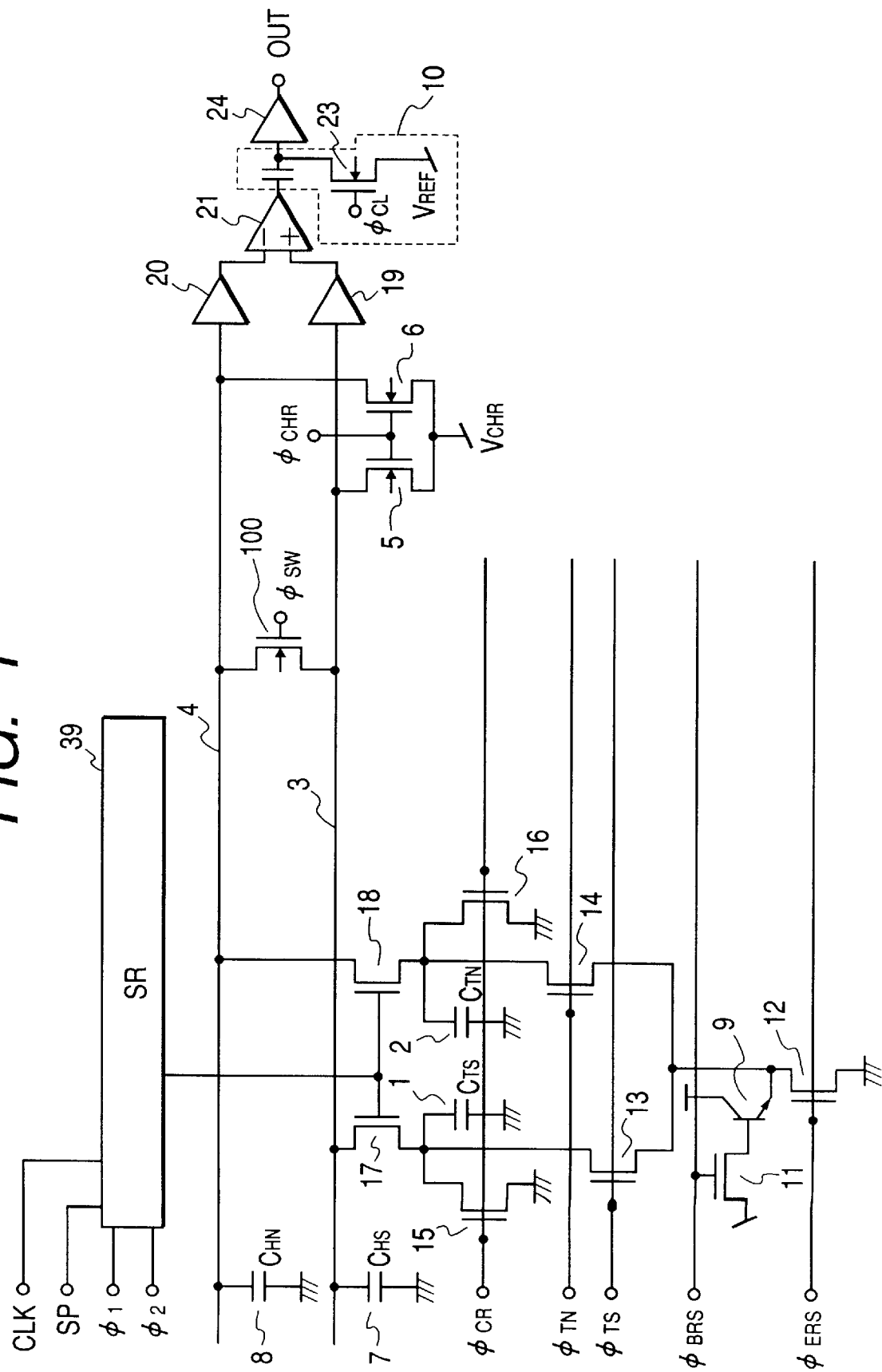
FIG. 1 is a circuit diagram of the first and second embodiments of the present invention.
Figure 2:
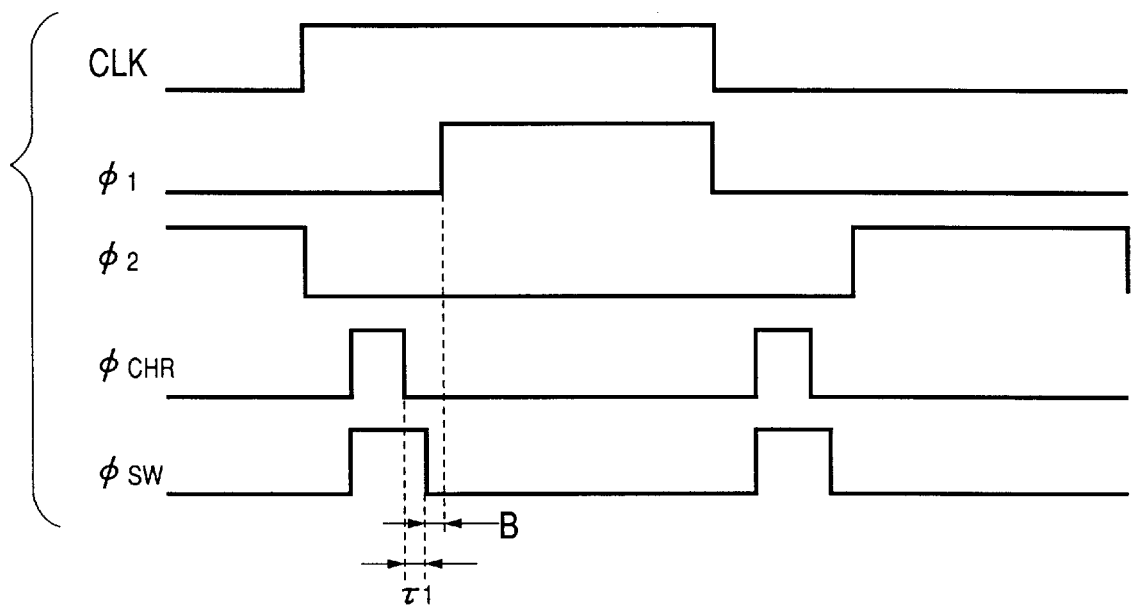
FIG. 2 is a timing chart of the first embodiment of the present invention.

FIG. 1 is a circuit diagram of the first embodiment of the present invention. FIG. 2 is a timing chart of the first embodiment of the present invention.

Figure 7:
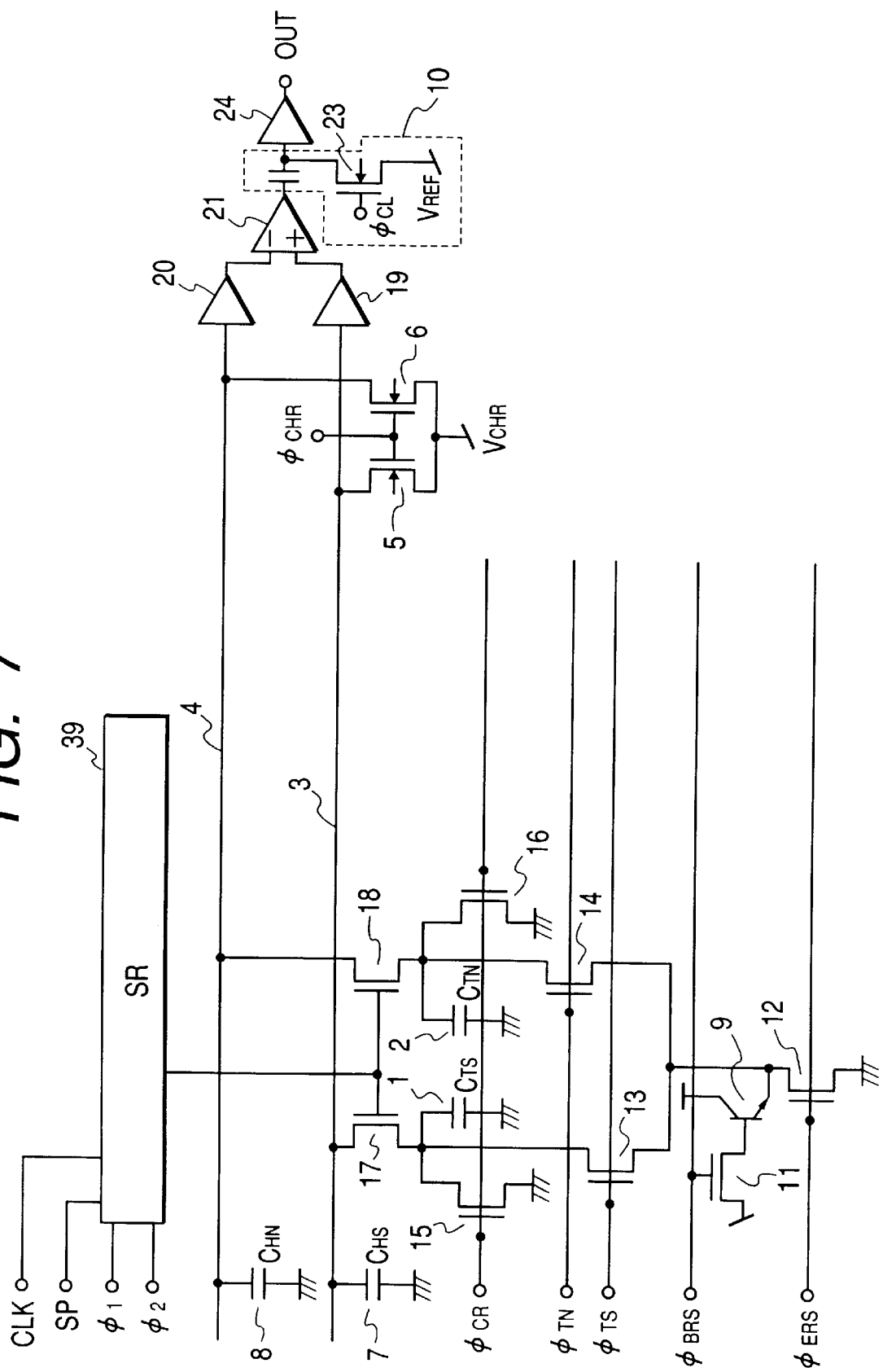
FIG. 7 is a circuit diagram of a related art.
Figure 8:
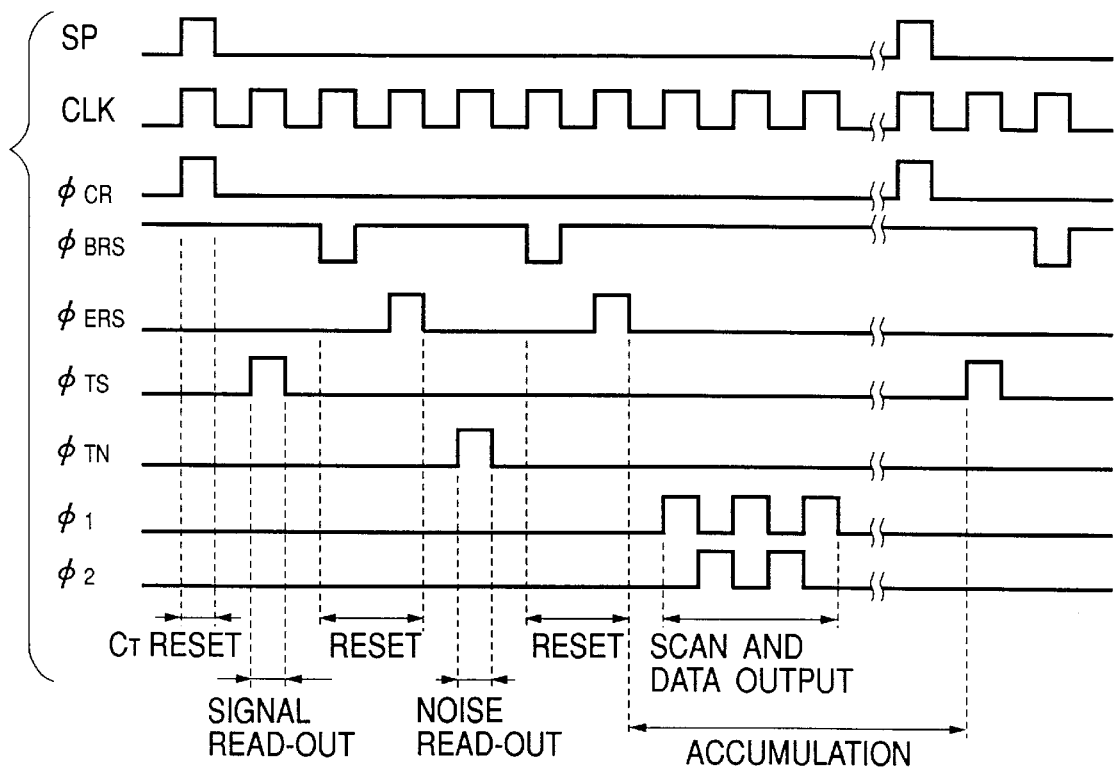
FIG. 8 is a timing chart of the related art.
Figure 9:
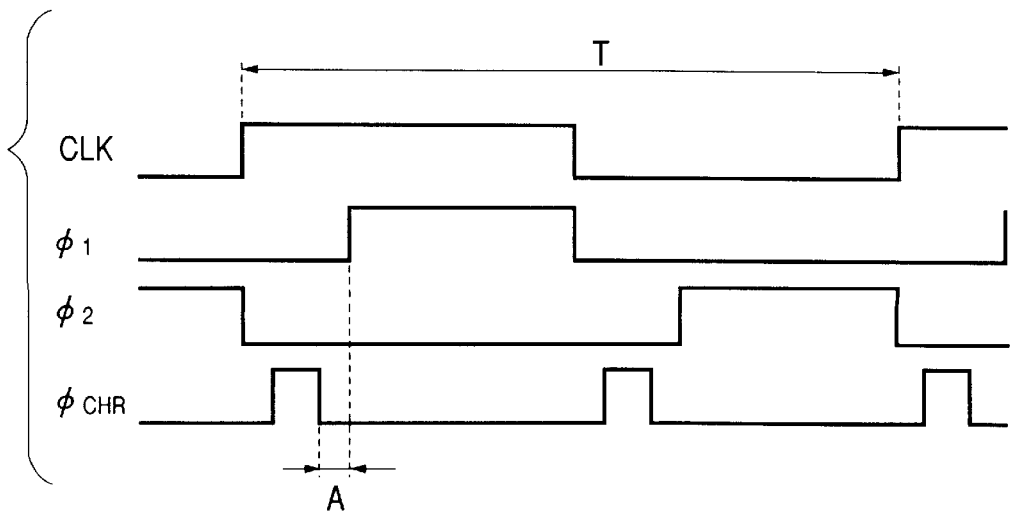
FIG. 9 is a timing chart (enlarged view of a read portion) of the related art.

The arrangement shown in FIG. 1 is the same as that shown in FIG. 7 except a switch MOS transistor 100 serving as a second switch means for connecting common output line capacitors CHS and CHN. The arrangement and operation of this photoelectric conversion apparatus are basically the same as the above-described arrangement, and a detailed description thereof will be omitted.

In this embodiment, as shown in FIG. 2, a reset pulse ΦCHR is set at "H" to start the reset operations of reset MOS transistors 5 and 6 as a first switch means. At the same time, a switch pulse ΦSW is set at "H" to turn on the switch MOS transistor 100. After the reset MOS transistors 5 and 6 complete their reset operations, the switch MOS transistor 100 is turned off. As shown in FIG. 2, when the reset MOS transistors 5 and 6 are turned off, a potential difference is generated between the common output line capacitors CHS and CHN. However, since the switch MOS transistor 100 is ON, the potential difference between the common output line capacitors CHS and CHN is canceled. Therefore, the potential difference between the common output line capacitors CHS and CHN after the switch MOS transistor 100 is turned off (period B shown in FIG. 2) can be reduced as compared to an arrangement without the switch MOS transistor 100.

A time τ1 after the reset MOS transistors 5 and 6 are turned off until the switch MOS transistor 100 is turned off is preferably:

$$\tau1 > (CHS+CHN) \times R_{ON}$$

($R_{ON}$: ON resistance of the switch MOS transistor 100) However, even when the time τ1 is shorter, the potential difference between the common output line capacitors CHS and CHN can be reduced as compared to the arrangement without the switch MOS transistor 100.

This embodiment was compared with the arrangement without the switch MOS transistor 100. In the arrangement without the switch MOS transistor 100, an odd bit synchronized with an input pulse Φ1 and an even bit synchronized with an input pulse Φ2 both to a shift register SR 39 had a level difference of 5 mV. Final FPN in a chip, which was output from an amplifier 24, was about 7 mV. In this embodiment, however, no level difference between bits was observed, and the final FPN in the chip was about 3 mV.

When a plurality of chips in a wafer was to be coupled in a wafer state, the difference between the chips was measured as a variation. In the arrangement without the switch MOS transistor 100, the variation (σ) in dark output (average value×of outputs from a plurality of pixels in one chip in a light-shielded state) in the wafer, i.e., the variation between the average values×of chips was 30 mV. In this embodiment, the variation was 22 mV.

At this time, the common output line capacitance CHS/CHN is 5 pF; the ON resistance $R_{ON}$ of the switch MOS transistor 100, 100 Ω; and the time τ1, 5 nsec.

Figure 3:
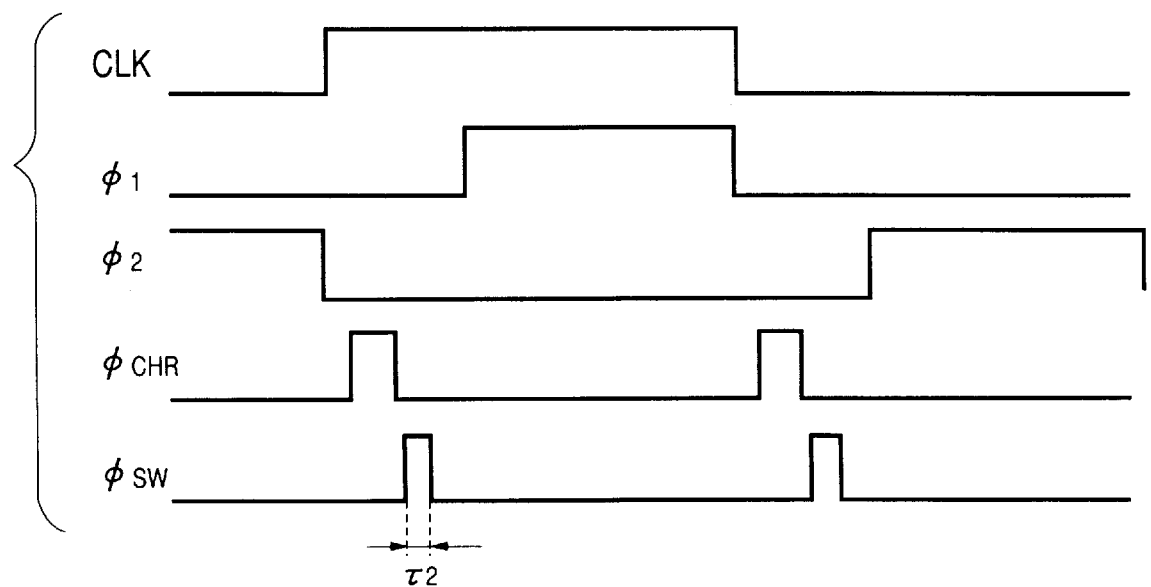
FIG. 3 is a timing chart of the second embodiment of the present invention.

The second embodiment of the present invention has the same circuit arrangement as that shown in FIG. 1 and a driving timing different from that of the first embodiment. FIG. 3 is a timing chart of the second embodiment of the present invention.

In this embodiment, when a reset pulse ΦCHR is set at "H", and the reset operations of reset MOS transistors 5 and 6 are ended, a switch pulse ΦSW is set at "H" to turn on a switch MOS transistor 100. Even by this driving method, the effect of the present invention can be obtained.

In this embodiment, a time τ2 for which the switch MOS transistor 100 is ON after the switch pulse ΦSW is set at "H" is preferably:

$$\tau2 > (CHS+CHN) \times R_{ON}$$

($R_{ON}$: ON resistance of the switch MOS transistor 100) However, even when the time τ2 is shorter, the potential difference between common output line capacitors CHS and CHN after resetting can be reduced as compared to an arrangement without an analog switch 101, as in the first embodiment.

Figure 4:
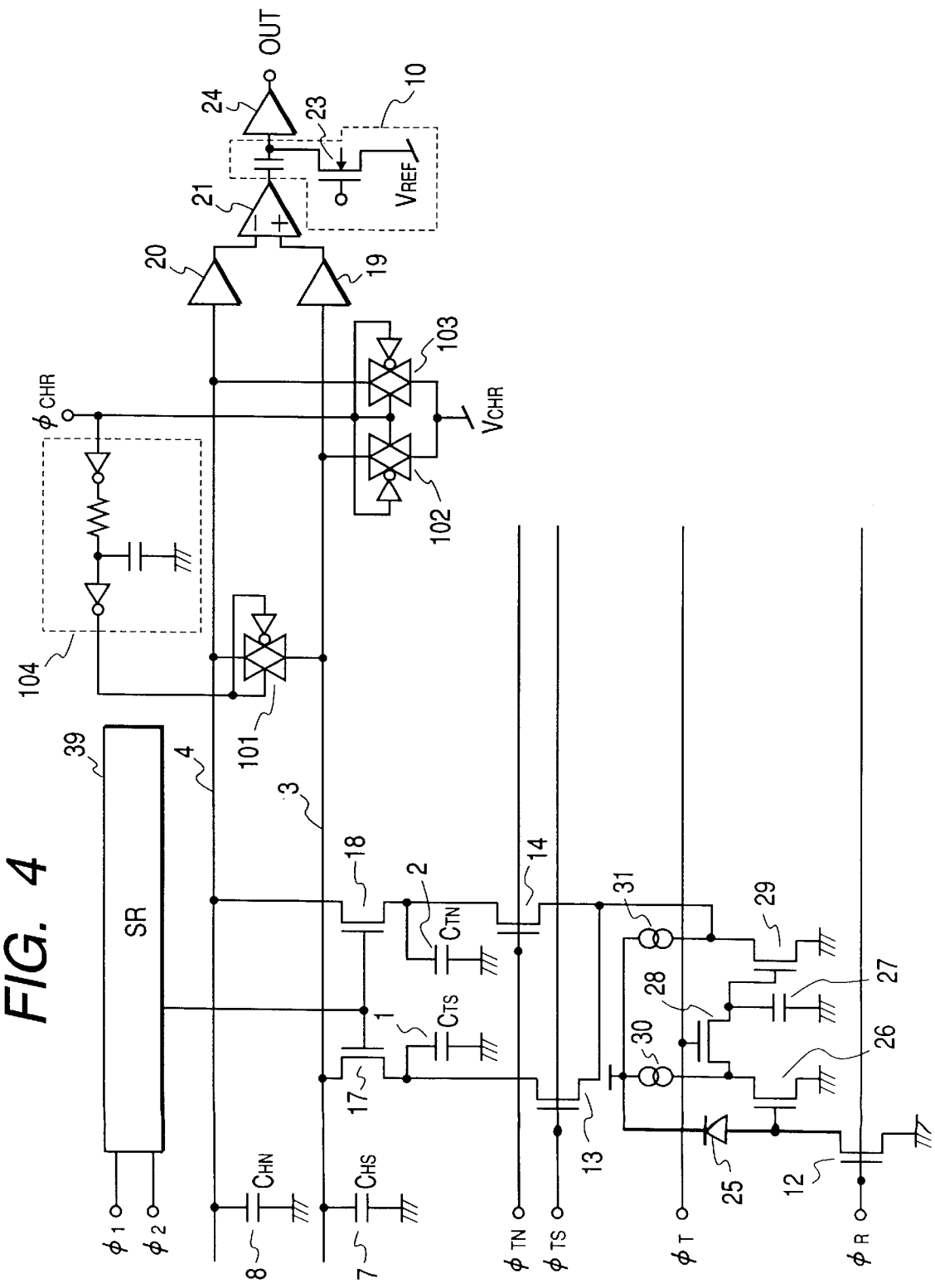
FIG. 4 is a circuit diagram of the third embodiment of the present invention.
Figure 5:
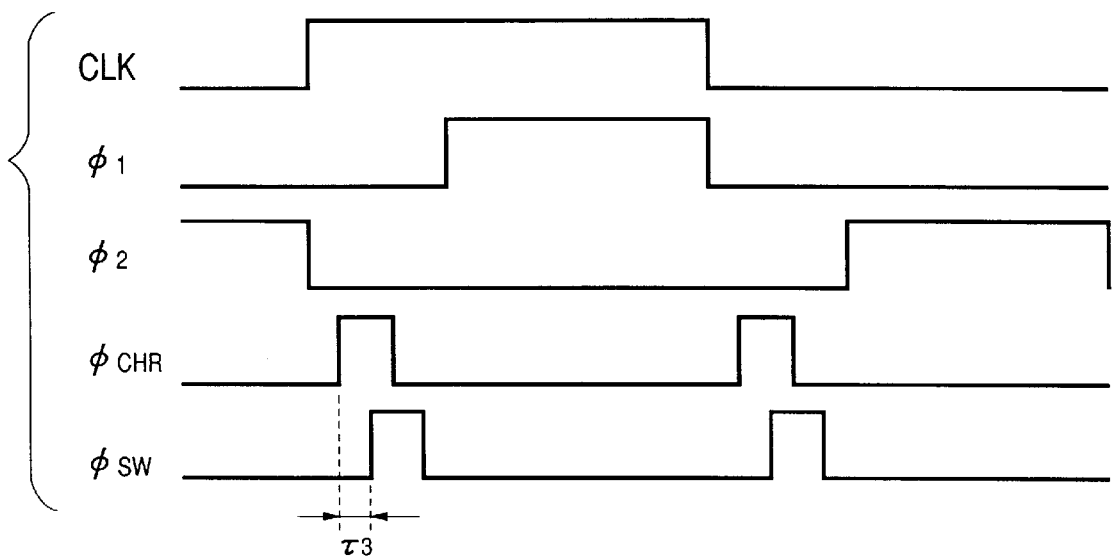
FIG. 5 is a timing chart of the third embodiment of the present invention.

FIG. 4 is a circuit diagram of the third embodiment of the present invention. FIG. 5 is a timing chart of the third embodiment of the present invention.

In this embodiment, a photoelectric conversion device is constituted by a photodiode 25 and a PMOS source follower 26, and charges in the photoelectric conversion device are read out from a transfer MOS transistor 28, a transfer capacitor 27, a PMOS source follower 29, and current sources 30 and 31. To suppress any variation between common output line capacitors CHS and CHN, analog switches 101, 102, and 103 each constituted by an inverter and a MOS transistor are used as a switch means for connecting the common output line capacitors CHS and CHN and a reset means for the common output line capacitors CHS and CHN.

To reduce an external drive pulse, a pulse for driving the switch means for connecting the common output line capacitors CHS and CHN is generated using a reset pulse (ΦCHR) for the common output line capacitors CHS and CHN and a delay circuit 104 constituted by a resistor, a capacitor, and two inverters at the two terminals. As the inverter, an EE inverter, an ED inverter, or a CMOS inverter can be used.

Therefore, as shown in FIG. 5, a pulse (ΦSW) for driving the switch means for connecting the common output line capacitors CHS and CHN is delayed from the reset pulse (ΦCHR) for the common output line capacitors CHS and CHN by a time τ3.

The time τ3 after the reset switches 102 and 103 for the common output line capacitors CHS and CHN are turned off until the analog switch for connecting the common output line capacitors CHS and CHN is turned off is preferably:

$$\tau 3 > (CHS + CHN) \times R_{ON}$$

($R_{ON}$: ON resistance of the analog switch 101)
However, even when the time τ3 is shorter, the potential difference between common output line capacitors CHS and CHN after resetting can be reduced as compared to an arrangement without the analog switch 101.

This embodiment was compared with the prior art without the analog switch 101. In the prior art, an odd bit synchronized with an input pulse Φ1 and an even bit synchronized with an input pulse Φ2 had a level difference of 4.3 mV. Final FPN in a chip, which was output from an amplifier 24, was about 5.8 mV. In this embodiment, however, no level difference between bits was observed, and the final FPN in a chip was about 2.7 mV.

The variation (σ) in dark output (average value×in the chip) in the wafer was 29 mV in the arrangement without the analog switch 101. In this embodiment, the variation was 21 mV.

The dependence of the FPN in the chip and the variation in dark output (average value in a chip) in the wafer on the power supply voltage will be described. In the arrangement without the analog switch 101, as the power supply voltage became higher, the FPN in the chip and the variation in dark output (average value in a chip) in the wafer increased. In this embodiment no dependence on the power supply voltage was observed.

At this time, the common output line capacitance CHS/CHN is 6.8 pF; the ON resistance $R_{ON}$ of the analog switch 101, 60 Ω; and the time τ3, 8 nsec.

Figure 6:
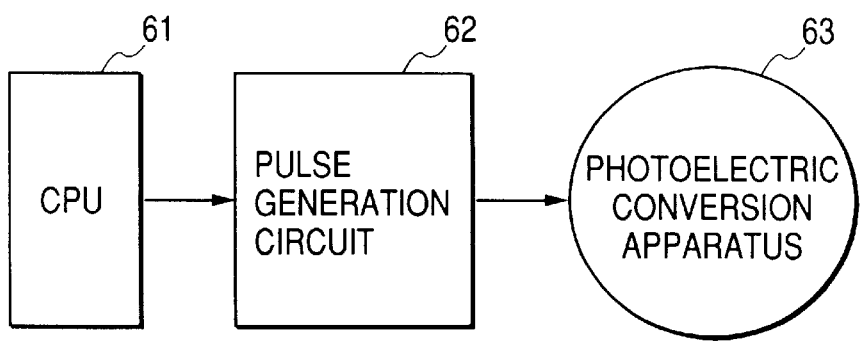
FIG. 6 is a control chart of pulse application to a photoelectric conversion apparatus.

In the first to third embodiments, the operation of the timing chart shown in FIG. 2, 3, or 5 for the circuit operation is executed when a CPU 61 controls a pulse generation circuit 62 to apply a pulse to a photoelectric conversion apparatus 63, as shown in FIG. 6.

In the above embodiments, a one-dimensional photoelectric conversion apparatus has been described. However, the present invention is not limited to the one-dimensional photoelectric conversion apparatus and can also be effectively applied to a two-dimensional photoelectric conversion apparatus employing the same capacitance division read scheme as described above.

In the above embodiments, each of the first and second switch means comprises a MOS transistor. However, the present invention is not limited to this, and any means which performs switch operation can be used.

In the above embodiments, as a photoelectric conversion means, a BASIS and photodiode+MOS source follower have been described. However, the effect of the present invention is not limited to the photoelectric conversion means.

In the above embodiments, a multi-chip contact image sensor has been mainly described. However, the present invention is preferably applied to a line sensor or area sensor for a reduction system because FPN can be reduced as compared to the prior art, as described above.

As has been described above, when the arrangement of the present invention is used, FPN in the photoelectric conversion apparatus, which cannot be completely removed in the prior art, can be removed, so a photoelectric conversion apparatus having a high S/N ratio can be provided. Especially, when this arrangement is applied to a multi-chip line sensor or area sensor, FPN due to the variation between chips can also be removed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A photoelectric conversion apparatus comprising:
   photoelectric conversion means;
   photoelectric signal holding means for accumulating a photoelectric signal from said photoelectric conversion means;
   noise signal holding means for accumulating a noise signal from said photoelectric conversion means;
   a photoelectric signal output line for outputting the signal accumulated by said photoelectric signal holding means, the accumulated signal being read out to said photoelectric signal output line by capacitance division;
   a noise signal output line for outputting the signal accumulated by said noise signal holding means, the accumulated signal being read out to said noise signal output line by capacitance division;
   first switch means for resetting said photoelectric signal output line and said noise signal output line to a fixed potential; and
   second switch means for directly connecting said photoelectric signal output line and said noise signal output line.

2. An apparatus according to claim 1, further comprising control means for performing control such that said second switch means completes operation after said first switch means completes operation.

3. An apparatus according to claim 2, further comprising control means for performing control such that said second switch means operates simultaneously with said first switch means during a predetermined period.

4. An apparatus according to claim 1, wherein a time (τ) after said first switch means completes operation until said second switch means completes operation is:

$$\tau > (CHS + CHN) \times RON$$

where CHS is a capacitance of said optical signal output line; CHN, a capacitance of said noise signal output line; and RON, an ON resistance of said second switch means.

5. An apparatus according to claim 1, wherein said first and second switch means share a driving source for operating said first and second switch means, and further comprising delay means for signaling an end of driving of said driving source to said second switch means after a predetermined period.

6. An apparatus according to claim 5, wherein said delay means comprises a capacitor, a resistor, and an inverter.

7. An apparatus according to claim 6, wherein said inverter includes a MOS inverter.

8. An apparatus according to claim 7, wherein each of said first and second switch means comprises a transistor.

9. An apparatus according to claim 8, wherein said transistor includes a MOS transistor.

10. An apparatus according to claim 9, wherein said MOS transistor comprises an NMOS transistor and a PMOS transistor, which are connected in parallel.

11. An apparatus according to claim 1, wherein said photoelectric conversion means comprises a bipolar transistor, a MOS transistor, a photodiode, and a an amplifier transistor for amplifying and outputting the photoelectric signal.

12. An apparatus according to claim 1, wherein said photoelectric conversion means comprises an amplifier transistor for amplifying and outputting a photoelectric signal.

13. A photoelectric conversion apparatus comprising:
   photoelectric conversion means;
   a plurality of output lines for reading out a signal output from said photoelectric conversion means;
   first switch means for resetting said plurality of output lines to a fixed potential;
   second switch means for directly connecting said plurality of output lines, wherein said first switch means and said second switch means share a driving source for operating said first and second switch means; and
   delay means for signaling an end of driving of said driving source to said second switch means after a predetermined period.

14. A signal processing apparatus comprising:
   a signal source;
   a plurality of output lines for outputting a signal from said signal source;
   reading-out means for reading out the signal from said signal source to said plurality of output lines;
   reset means for resetting said plurality of output lines to a fixed potential;
   switch means for directly connecting said plurality of output lines; and
   control means for completing operations of said reset means and said switch means before said reading out means performs a read-out operation.

15. An apparatus according to claim 14, wherein said signal source includes photoelectric conversion means.

16. An apparatus according to claim 14, further comprising:
   a drive source for driving said reset means and said switch means in common; and
   delay means for signaling a completion of a driving operation of said drive source to said switch means after a predetermined period.

17. An apparatus according to claim 15, further comprising:
   a drive source for driving said reset means and said switch means in common; and
   delay means for signaling a completion of a driving operation of said drive source to said switch means after a predetermined period.

18. A signal processing apparatus comprising:
   a signal source;
   first and second output lines for outputting a signal from said signal source;
   reset means for resetting said first and second output lines to a fixed potential; and
   switch means for directly connecting said first and second output lines, wherein said switch means is arranged so that said switch means includes a single transistor, a first main electrode of which is connected to said first output line and a second main electrode of which is connected to said second output line, or is arranged so that said switch means includes a plurality of single transistors connected to each other in parallel, the first main electrode of each of which being connected to said first output line and the second main electrode of each of which being connected to said second output line.

19. An apparatus according to claim 18, wherein said single transistor includes an MOS transistor.

20. An apparatus according to claim 18, wherein said plurality of single transistors connected to each other in parallel include a MOS transistor and a PMOS transistor.

21. An apparatus according to claim 18, wherein said signal source includes photoelectric conversion means.

* * * * *

UNITED STATES PATENT AND TRADEMARK OFFICE
CERTIFICATE OF CORRECTION

PATENT NO. : 5,998,779
DATED : December 7, 1999
INVENTOR(S) : HIRAKU KOZUKA

It is certified that error appears in the above-identified patent and that said Letters Patent is hereby corrected as shown below:

ON TITLE PAGE

[56] References Cited, under FOREIGN PATENT DOCUMENTS:
"5,771,070  5/1998  Ohzu et al." should read
--5,771,070  6/1998  Ohzu et al.--.

COLUMN 2

Line 39, "completely" should read --are completely--.

COLUMN 4

Line 18, "value X" should read --value x--; and
Line 20, "values X" should read --values x--.

COLUMN 7

Line 5, "a bipolar" should be deleted; and
Line 6, "transistor, a MOS transistor, a photodiode, and a" should be deleted.

UNITED STATES PATENT AND TRADEMARK OFFICE
CERTIFICATE OF CORRECTION

PATENT NO.  : 5,998,779
DATED       : December 7, 1999
INVENTOR(S) : HIRAKU KOZUKA It is certified that error appears in the above-identified patent and that said Letters Patent is hereby corrected as shown below:

<u>COLUMN 8</u>

Line 37, "a MOS" should read --an nMOS--; and "PMOS" should read --pMOS--.

Signed and Sealed this

Twentieth Day of March, 2001

Attest:

NICHOLAS P. GODICI

*Attesting Officer*    Acting Director of the United States Patent and Trademark Office